Patented Feb. 19, 1935

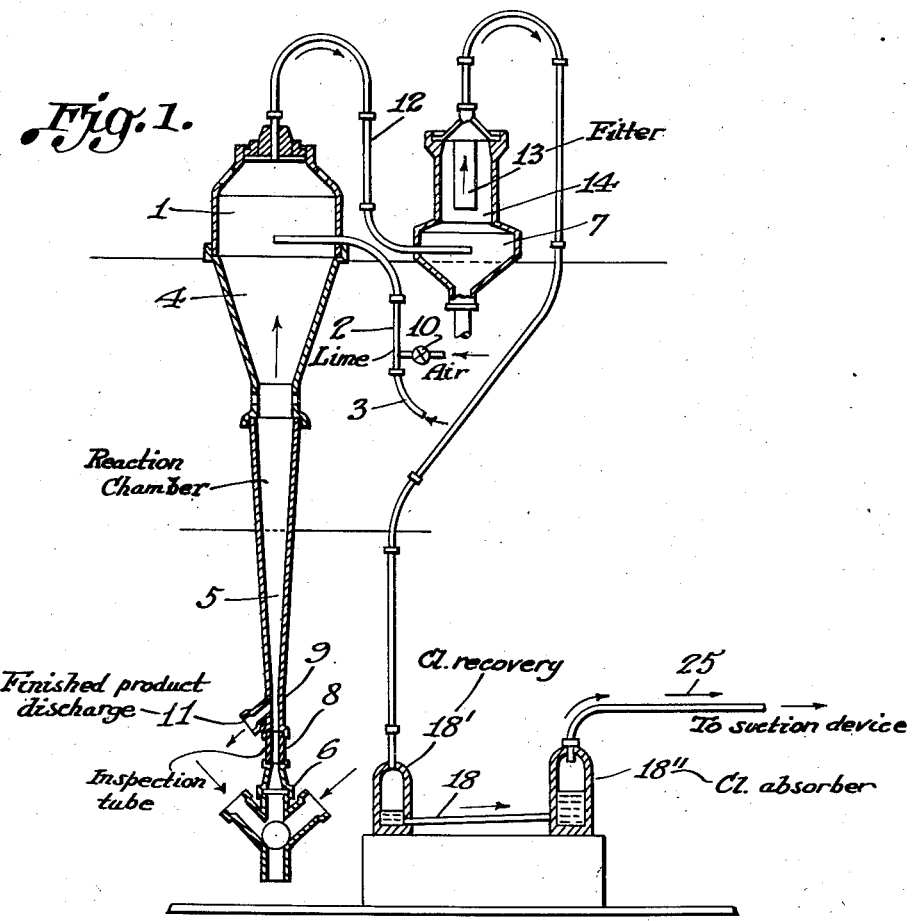
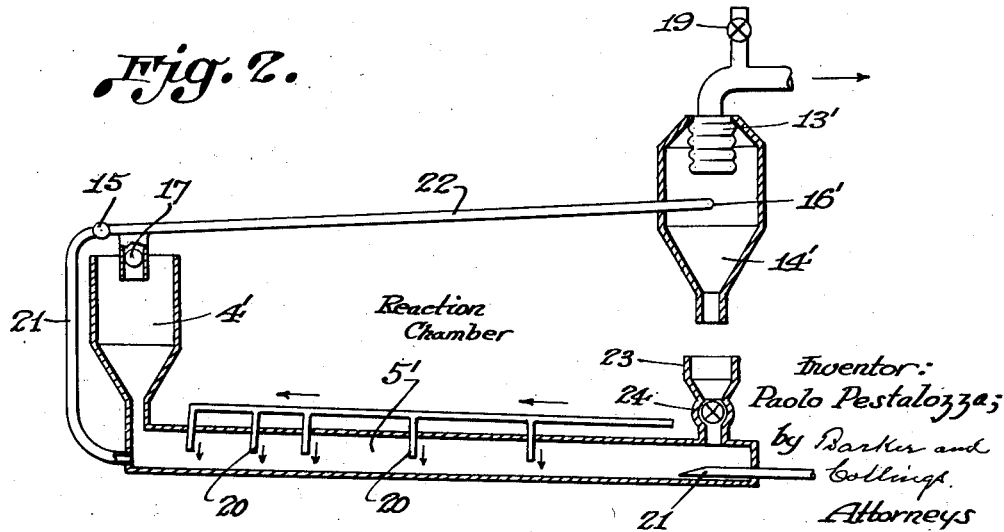

1,992,090

UNITED STATES PATENT OFFICE 1,992,090

PROCESS FOR MIXING GASES AND SOLIDS

Paolo Pestalozza, Milan, Italy

Application December 12, 1931, Serial No. 580,710
In Italy December 22, 1930

2 Claims. (Cl. 23—86)

This invention relates to a process and apparatus for effecting an intimate mixture between a solid material in a powdered or finely comminuted form and a gaseous material.

The main object of the present invention is to secure an intimate mixture and maximum contact between such bodies for physical purposes or for effecting chemical reactions without the use of mechanical mixing elements which might come into contact with the material to be mixed.

A further object of the invention is to apply any desired movement to the said materials without the need for mechanical elements of any kind coming into contact therewith.

The invention may be used for mixing powdered bodies and gaseous bodies to effect various chemical transformations and a particular application of the invention is for the production of bleaching powder (chloride of lime) by effecting a reaction between lime in the solid or powdered state and gaseous chlorine and in connection with this particular application it is an object of the invention to effect a very efficient contact with and absorption by the slaked lime of the gaseous chlorine.

These objects are carried out in accordance with the invention by means of a pneumatic system operating either by suction or compression which, suitably regulated, gives the desired movements to the materials to be treated one being in the gaseous state and the other in the form of a solid or powder. In the specific case of the manufacture of bleaching powder the pneumatic system by its nature produces numerous advantages, among which may be mentioned that a very effective cooling is produced by means of the air introduced with the chlorine in suitable quantities, the air serving to neutralize the heat produced by the combination of the lime and the chlorine. In this way it is possible to realize an intensified production and to obtain large productions with comparatively small apparatus compared with those generally employed.

It should be noted here that despite the considerable amount of air introduced there is easily obtained a product of high chlorine content without the action of the carbon dioxide in the air producing any deleterious effect.

It is recognized that the various systems known hitherto for the production of bleaching powder (with the exception of the chlorinating chambers which require large surfaces and which have other disadvantages) are essentially of a mechanical nature and carry the necessity of using more or less complicated mechanical elements which are sometimes in direct contact with the materials to be mixed (chlorine, lime and bleaching powder) which are corrosive. Further, in all the mechanical systems, even the best and most modern (Backmann with vertical columns, Rudge with rotating, horizontally inclined tubes or rotating helices, all derived from the old Haasenclever) the mixture and the intimate contact between the gas and the powder are very limited in comparison with that which is obtained by the system of the present invention. Consequently also the volumes of gas (mixture of chlorine and air) which can be passed through the apparatus are very limited relatively to the size, if, as is necessary, it is required that the lime should completely or mainly absorb the chlorine. It thus results that the quantity of air introduced is limited by reducing the amount of gaseous chlorine introduced and the cooling on account of this air is, in effect, equally limited which in its turn limits definitely the practical value of the apparatus.

There is illustrated in the accompanying drawing the pneumatic process forming the subject of the present invention, as applied by way of example to the production of bleaching powder.

Fig. 1 illustrates diagrammatically a form of apparatus without return circulation and Fig. 2 shows diagrammatically a slightly modified system with return circulation.

In the construction shown in Fig. 1 the slaked lime is charged into the cyclone chamber 1 by suction through the tube 2 and the movable coupling pipe 3. From the cyclone chamber 1 the material falls through the chamber 4 into the reaction or suspension chamber 5. Here the lime encounters the current of mixed gas i. e. air and chlorine which enters the reaction chamber through a diffuser placed at 6, the gases being removed by a suction current maintained through the body 7 (filter condenser) in the direction of the arrows. In the reaction chamber 5 the lime is subjected to an ascending gas current and to a continued suspension, a part thereof falling downwardly and a part being forced violently upwards towards the chamber 4. The speed and the active force of the lime, thus finely divided and brought into intimate contact with the gas itself which gives it motion, diminishes little by little through the chamber 4, either by the weight of material which tends to fall towards the bottom or by the progressively growing form of the chamber 4 which enlarges to a maximum at the chamber 1, thus resulting in a speed insufficient to overcome the force of gravity and the force remaining in the lime which is thus obliged to fall downwardly. Owing to the form of the chamber 4 and the suction produced, the lime projected upwardly within the chamber 4 into the central zone along the vertical axis tends to fall and moves towards the periphery in order to return again by gravity to the chamber 5, always at the periphery while the centre part is subjected to the ascending currents. In this way there is produced an exchange and continuous renewal of the materials in contact which is obliged during the course of a certain time to pass entirely through the movements indicated above in intimate contact with the gaseous mixture.

Since, as is known, the chemical transformation of lime into bleaching powder is effected by the contact of lime with gaseous chlorine, it is evident that in the manner described, the best conditions for this reaction are realized by producing a high degree of subdivision and renewing continually the material such as cannot be obtained with normal mechanical means.

Between the gas diffuser 6 and the reaction chamber 5 there is provided an inspection tube 8 for controlling the functioning of the apparatus and a union 9 for the lateral discharge. It is evident that by removing the suction in the body 1 by simply opening the air tube 10 the materials contained in the chambers 4, 5 are discharged by their own weight laterally through the said union 9 and the discharge opening 11.

The body 7 forms the necessary filter condenser designed to retain the small amount of material carried over by the ascending current away from the chamber 1 and into the zone 7 through the tube 12. This part of the apparatus may function as a porous filter 13 in which event it serves to retain and recover the material in the form of a dry powder or it may be in the form of a condenser 14 when it is designed to retain and eventually recover the material in the presence of moisture. In order to retain any final traces from the gas which is taken to the suction pump, not represented on the drawing and situated in the direction of the arrow 25, there is a final or end absorber 18 which makes the gas bubble through a suitable liquid placed in the receivers 18', 18" before arriving at the pump.

Fig. 2 represents a more complex apparatus permitting a return circuit of the lime which has already been activated. According to this type of apparatus the reaction chamber 5' is formed horizontally or preferably inclined, the chamber 4' having the same function as already described, but the filter condenser 13' and the cyclone 16' are arranged within the body 14' which functions as a cyclone separator and recoverer. The material discharged from the body 14' is returned to the reaction area through the funnel 23, 24 or may be definitely discharged from the active zone.

By examining Fig. 2 it is easy to understand that the operation is controlled by the adjustment of the cocks 17, 15 and the valve 19. By regulating suitably the carriers for the gaseous material 20, 21 there is obtained suspension and transfer of the lime along the chamber 5', the product finally entering the chamber 4' for the reaction or directly to 14' through the tubes 21, 22 for discharging and returning to the reaction zone.

It is evident that the arrangements of the organs described and represented are in no way limitative of the invention but are given merely by way of example and the same result can be realized by different apparatus.

I claim:—

1. The herein described process for mixing powdered solids and gases to facilitate reactions between them, which consists in confining a mass of the mixture, causing an ascending current of the gases to be established within the confined mixture which current is being constantly renewed and the force of which progressively varies, thereby agitating the solids within the mass, and facilitating reactions between them and the gaseous constituents, diminishing the velocity of the said current as it moves upward until it is no longer strong enough to support the solids but allows them to fall back by gravity, restoring the falling solids to the ascending current to be further moved, agitated and acted upon by the gases, leading off the gaseous constituents from the confined mass, and intermittently breaking or stopping the ascending current within the confined mass, permitting the solids of the mixture to fall by gravity, and collecting and leading away such solids from the lower portion of the confined mass.

2. The herein described process for producing bleaching powder consisting in passing a stream of mixed chlorine gas and air into and through a reaction chamber beneath a solid-material-delivery inlet, such stream being of progressively decreasing intensity, delivering finely divided lime from said inlet and causing it to fall under the influence of gravity through said gas stream until it comes into contact with that part of the stream which is of sufficient velocity to hold the lime particles in suspension and also to force them upwardly within the reaction chamber until a point is reached where the velocity of the stream is insufficient to maintain the lime particles in suspension, whereupon they again fall until they come into contact with that portion of the chlorine-air gas stream which is of sufficient velocity to force the lime particles again upwardly, the chlorine-air gas stream being continuously withdrawn from the upper portion of the reaction chamber, and filtering such withdrawn gas.

PAOLO PESTALOZZA.